US 12,515,159 B2

(12) United States Patent
Joos et al.

(10) Patent No.: US 12,515,159 B2
(45) Date of Patent: Jan. 6, 2026

(54) FILTER ELEMENT AND FILTER SYSTEM

(71) Applicant: MANN+HUMMEL GmbH, Ludwigsburg (DE)

(72) Inventors: Bernd Joos, Lorch (DE); Timo Dirnberger, Marbach (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 382 days.

(21) Appl. No.: 18/111,745

(22) Filed: Feb. 20, 2023

(65) Prior Publication Data

US 2023/0201754 A1 Jun. 29, 2023

Related U.S. Application Data

(63) Continuation of application No. PCT/EP2021/072838, filed on Aug. 17, 2021.

(51) Int. Cl.
*B01D 46/00* (2022.01)
*B01D 46/52* (2006.01)
*B60H 3/06* (2006.01)
*F02M 35/024* (2006.01)

(52) U.S. Cl.
CPC ..... *B01D 46/0087* (2013.01); *B01D 46/0006* (2013.01); *B01D 46/0041* (2013.01); *B01D 46/521* (2013.01); *B01D 2273/10* (2013.01); *B01D 2279/60* (2013.01); *B60H 3/0625* (2013.01); *F02M 35/0245* (2013.01); *F02M 35/02491* (2013.01)

(58) Field of Classification Search
CPC ............ B01D 46/0087; B01D 46/0006; B01D 46/0041; B01D 46/521; B01D 2273/10; B01D 2279/60; B01D 46/0097; B01D 2271/022; B01D 2277/20; B01D 2277/30; B01D 2279/40; B60H 3/0625; F02M 35/0245; F02M 35/02491
USPC .................................................... 55/312, 500
See application file for complete search history.

(56) References Cited

U.S. PATENT DOCUMENTS

| 2006/0168920 | A1 | 8/2006 | Cassell et al. |
| 2007/0144154 | A1 | 6/2007 | Keller et al. |
| 2010/0186596 | A1 | 7/2010 | Miller et al. |

(Continued)

FOREIGN PATENT DOCUMENTS

| DE | 102004036083 A1 | 2/2006 | |
| DE | 102008036913 B3 * | 11/2009 | ......... B01D 46/0006 |

(Continued)

*Primary Examiner* — Jennifer Dieterle
*Assistant Examiner* — Qianping He

(57) ABSTRACT

A filter element for filtering a fluid has a frame and at least one filter bellows arranged in the frame and provided with a first areal inflow surface for a first fluid flow and at least one second inflow surface for a second fluid flow separate from the first fluid flow. The second inflow surface is separate from the first areal inflow surface. A flow channel is provided to guide the second fluid flow and has a raw-side flow channel section arranged within the frame. A filter system provided with a filter housing is provided with such a filter element arranged exchangeably in the filter housing between a raw side and a clean side. The filter housing has a first inlet for the first fluid flow communicating with the first inflow surface and at least a second inlet for the second fluid flow communicating with the second inflow surface.

16 Claims, 4 Drawing Sheets

(56) References Cited

U.S. PATENT DOCUMENTS

2011/0023427 A1    2/2011   Srinivasan et al.
2016/0090946 A1    3/2016   Tomlin et al.

FOREIGN PATENT DOCUMENTS

| DE | 18/111745 U1 | 10/2015 |
| DE | 202015105378 U1 | 10/2015 |
| DE | 102014007284 A1 | 11/2015 |
| DE | 102016011158 A1 | 3/2018 |
| DE | 102017011876 A1 | 8/2018 |
| DE | 102017211090 A1 | 1/2019 |
| EP | 2305992 A2 | 4/2011 |
| JP | 2008232111 A | 10/2008 |
| JP | 2014125880 A | 7/2014 |
| WO | 12025455 A1 | 3/2012 |

\* cited by examiner

FILTER ELEMENT AND FILTER SYSTEM

CROSS-REFERENCE TO RELATED APPLICATIONS

This application is a continuation application of international application No. PCT/EP2021/072838 having an international filing date of 17 Aug. 2021 and designating the United States, the international application claiming a priority date of 19 Aug. 2020 based on prior filed German patent application No. 10 2020 121 712.9, the entire contents of the aforesaid international application and the aforesaid German patent application being incorporated herein by reference.

BACKGROUND OF THE INVENTION

The invention concerns a filter element for filtering a fluid, in particular for use for cassette air filters of an internal combustion engines or as cabin air filters, in particular of a motor vehicle, as well as a filter system with a filter element.

In practice, particle filters are used for filtering out particulate contaminants contained in gaseous fluids, for example, air. The particle filters comprise a filter housing with an inlet for the fluid to be filtered and with an outlet for the filtered fluid. According to one construction, the filter housing comprises an insertion opening for a filter element in order to position the latter in an insertion compartment in the interior of the filter housing. The filter element arranged in the insertion compartment can therefore be flowed through in filter operation by the fluid to be filtered along a main flow axis, preferably from bottom to top. A seal device of the filter element enables the required sealing seat of the filter element in the filter housing so that an undesirable leakage or bypass flow of the gaseous fluid to be filtered about the filter element is counteracted in filter operation.

DE 10 2008 036 913 B3 describes an air filter system with a flat plate-shaped filter element that is of a configuration as compact as possible and that still provides measures in order to counteract clogging of the filter element with snow and/or ice. Such an air filter system provides a frame into which a filter element of a plate-shaped configuration can be inserted which comprises a raw air side, a clean air side arranged substantially parallel thereto, and narrow sides extending substantially perpendicularly thereto, and with a housing in which the frame together with filter element can be inserted. In case that the filter element provides a rectangular base surface, a total of four narrow sides are provided, two parallel extending longitudinal narrow sides and two transverse narrow sides extending perpendicularly to the longitudinal narrow sides, respectively. Moreover, a bypass valve is provided through which, in the open state, warm air can flow into the region positioned between the housing or the frame and at least one narrow side in such a way that the warm air flows from there through the narrow side into the filter element and out of the filter element through the clean air side.

SUMMARY OF THE INVENTION

It is an object of the invention to provide an improved filter element for filtering a fluid that counteracts clogging of the filter element with suspended particles from the fluid.

A further object is to provide a filter system for filtering a fluid for receiving such an exchangeable filter element.

The aforementioned objects are solved according to an aspect of the invention by a filter element for a filter system with at least one filter bellows arranged in a frame and comprising a first areal inflow surface for a first fluid flow as well as at least one second inflow surface for a second fluid flow separate from the first fluid flow, wherein the second inflow surface is separate from the first inflow surface, and wherein a raw-side flow channel section of a flow channel provided for guiding the second fluid flow is arranged inside of the frame.

Beneficial embodiments and advantages of the invention result from the further claims, the description, and the drawing.

A filter element for filtering a fluid is proposed with at least one filter bellows arranged in a frame and comprising a first areal inflow surface for a first fluid flow as well as at least one second inflow surface for a second fluid flow separate from the first fluid flow. The second inflow surface is separate from the first inflow surface. A raw-side flow channel section of a flow channel provided for guiding the second fluid flow is provided arranged within the frame.

The separation between first and second inflow surface is advantageously fluid-tightly embodied, in particular embodied at least sufficiently fluid-tightly. In this context, sufficiently fluid-tight means that the separation under normal operating conditions is designed to be fluid-tight such that the function of the filter element is practically not disturbed. "Normal operating conditions" means that the incoming fluid flow, in particular the incoming airflow, is under normal atmospheric pressure and is not blown in at excess pressure. A leakage is tolerable when the function of the filter element is practically undisturbed, i.e., the leakage does not allow larger particles to pass than the medium of the filter element. The separation can be realized within the filter bellows, for example, by a separation wall of plastic material or the like projecting into the filter bellows or by a separation wall adjoining the filter bellows.

The filter bellows can be designed in particular as one piece so that the two inflow surfaces are formed in a single filter bellows of one filter medium. Alternatively, it is however also possible that the two inflow surfaces are realized in two different filter bellows with the same or with different filter media and can be arranged so as to adjoin each other in the filter element.

Beneficially, by means of the filter element a filter system can be provided that permits a beneficial variant formation with or without suspended particle valve. In this way, components can be dispensed with so that no additional injection molding tools are required when injection molding is employed for producing the filter system.

The flow direction for a flat filter is oriented, for example, perpendicularly to the inflow surface and the outflow surface which are provided in a flat filter at oppositely positioned flat sides of the filter bellows. Preferably, in a filter with erected folds, the inflow surface and the outflow surface form the surfaces at which the fold edges are positioned, respectively.

For the filter element according to the invention, which, for example, can be embodied as a molded-on plastic frame filter element (MPF element), in addition to the main filtration region with a first inflow surface of the filter bellows, at least one further filtration region with a second inflow surface is present which serves for connecting a further intake location of a fluid, for example, air. The connection of the further intake location can be realized at the end face and/or by rim segments of a separated region at the molded-on plastic frame filter element with a partial deflection of the second fluid flow. The rim segment in this context is an areal element within the filter bellows near the circumference or adjoining the circumference of the filter bellows, for example, a narrow side. In a particular embodiment, the first and the second inflow surface can be parallel to each other.

The second fluid flow can be realized from the backside of the filter bellows and, for example, can be deflected by 180° or more so that the first and the second inflow surface are positioned at the same side of the filter bellows.

The separate further filtration region at the MPF element can be located in this context at the rim but also inside of the filter element. It is also possible to provide a plurality of further filtration regions with further inflow surfaces. They can be embodied for the same or for different connection directions.

Such an embodiment of the filter element comprises significant advantages compared to the prior art describing, for example, snow valve solutions with filter elements of paper which may have a nonwoven attached at the filter element at the raw air side, the nonwoven sealing directly a further inflow channel. The filter element according to the invention comprises a separate inflow surface. A separate second fluid flow which can also be heated, for example, can be supplied through the second inflow surface of the further filtration region. In this manner, it is possible to filter different air flows with a molded-on plastic frame filter element. As filter bellows, for example, a filter bellows of a nonwoven or the like folded in a zigzag shape can be employed.

The separate further filtration region of the filter element which forms the second inflow surface, can be designed as a chamber separated from the first fluid flow. For this purpose, a separation element can be provided. A wall of the chamber can thus effectively prevent that a flow over to the main filtration region with the first inflow surface occurs. The chamber can be realized, separated by a rib as a separation element, in a rim-side fold region of the filter bellows. The rib can engage in the filter bellows or it can adjoin a fold of the folded bellows.

As needed, it can be advantageous to use at least two different filter bellows with different filter media for the two inflow surfaces so that each filter bellows comprises an inflow surface which are then separated from each other by the separation element. In this way, it is possible, for example, that the filter bellows of the first inflow surface is embodied as a folded filter and the filter bellows of the second filtration region as a nonwoven layer. The folded filter comprises a significantly higher filtration surface than the nonwoven layer so that the functional division into the main filtration region for the normal operation for the regular flow, when the first inflow region is freely passable, and into an auxiliary filtration region for flow in emergency situations, when the first inflow region is clogged, is accounted for.

The second fluid flow can be realized with heated air. The filter element can be operated in an emergency operation via the second inflow when the first inflow surface is clogged by suspended particles in the fluid, for example, by snow. Due to the second inflow surface, the filtration task of the filter element is ensured even for clogged first inflow surface.

According to an advantageous embodiment, at least one separation element can be arranged in the filter bellows between first and second inflow surfaces. In this manner, it can be effectively prevented that a first fluid flow which is to reach substantially only the first inflow surface, reaches the second inflow surface and thus could possibly clog the second inflow surface with suspended particles from the fluid. The fluid flow for the second inflow surface, in turn, can flow preferably through this part of the filter bellows which is therefore free of clogging by suspended particles, for example, by snow.

According to an advantageous embodiment, the flow channel section can adjoin a rim segment, for example, an end face of the filter element. This enables a compact configuration of the filter element. Advantageously, a flat filter bellows can be used which is arranged in a frame comprising also the flow channel section. A plastic frame can be molded around both filter bellows and flow channel section.

According to an advantageous embodiment, the flow channel section for the second fluid flow can comprise a segment parallel or at a slant to a narrow side of the filter bellows and a segment parallel to or at a slant to a flat side of the filter bellows. Advantageously, the segments of the flow channel section are spatially curved in a manner beneficial to flow.

The second fluid flow can flow in the flow channel section opposite to the flow direction of the first fluid flow through the first filter region, enter the filter bellows at the second inflow surface, and flow through the filter bellows in the same direction as the first fluid flow. A flow deflection, in particular a flow reversal, in the flow channel section enables the arrangement of the raw-side inlet for the second fluid flow in a beneficial manner with regard to installation space.

According to a further advantageous embodiment, the flow channel section for the second fluid flow can comprise a segment relative to a narrow side of the filter bellows and a segment at an angle between 0° and 180° relative to a flat side of the filter bellows.

According to a further embodiment, the flow channel section can adjoin an arbitrary surface of the filter element, for example, can be arranged centrally in the filter element, wherein the filter bellows in the region of the flow channel section is interrupted and/or is sealed against the flow channel section.

According to an advantageous embodiment, a cover element can be provided which covers the flow channel section for the second fluid flow at an end face as well as the second inflow surface. In this way, the flow channel section can be closed off relative to a side of the filter element, for example, toward the raw side, and the second fluid flow can be deflected toward the second inflow surface of the filter bellows. The cover element can be attached at the filter bellows via a separation element. The separation element can be connected fluid-tightly, preferably sufficiently fluid-tightly at least under normal operating conditions, to the cover element for areal coverage of the second inflow surface against the first fluid flow. The cover element and the separation element can be formed, for example, of plastic material. The separate further filtration region of the filter element for the second inflow surface can be designed as a chamber which is separated relative to the first fluid flow. The separation element can thus effectively prevent that a flow of the second fluid flow over to the main filtration region with the first inflow surface occurs. The separation element can be a rib which projects into the filter bellows or can be attached to the filter bellows.

According to an advantageous embodiment, the frame can comprise a seal surface which is provided for sealing filter bellows and flow channel section against the housing and for sealing between the outflow side of the filter bellows and the raw-side flow channel section. As a seal element, a one-part seal in the form of a so-called loop element can be used. It comprises a first closed seal ring which seals the filter bellows and a second closed seal ring which seals the flow channel section but does not surround a filter surface.

According to an advantageous embodiment, the filter element advantageously can be embodied as a so-called drawer filter element for a lateral insertion into a filter housing. A drawer filter element represents an easy mounting solution for the integration of the filter element in a filter system which can also be easily exchanged in a service situation. The drawer filter element can be inserted transversely to the flow direction into a filter housing. Alternatively, it is however also possible to insert the filter element from above into a housing bottom part which subsequently can be closed by a housing cover.

According to an advantageous embodiment, the at least one filter bellows can be folded in a zigzag shape to folds with parallel fold edges following each other in a length extension of the filter bellows and each extending between oppositely positioned end face edges of the filter bellows. In this context, a continuous frame which also encloses the flow channel section can be molded circumferentially around the at least one filter bellows. When two different filter bellows are arranged in the filter element for the two inflow regions, a continuous frame can also be molded circumferentially around both filter bellows together. Such a filter element can be advantageously used as an air filter, for example, of an internal combustion engine, and represents an inexpensive and efficient solution of an air filter. Due to the molded-on frame, the filter element can be easily mounted and also exchanged, as needed.

According to a further aspect, the invention concerns a filter system for filtering a fluid with a filter housing and a filter element for filtering the fluid exchangeably arranged in the filter housing between a raw side and a clean side, with at least one filter bellows arranged in a frame and comprising a first areal inflow surface for a first fluid flow as well as at least one second inflow surface for a second fluid flow, wherein the second inflow surface is separate from the first inflow surface. In this context, a raw-side flow channel for guiding the second fluid flow extends from a raw-side inlet to the second inflow surface. The filter housing comprises a first inlet for inflow of the first fluid flow at the first inflow surface and at least the second inlet for inflow of the second fluid flow at the at least second inflow surface, wherein a flow channel section of the flow channel is provided arranged within the filter element.

In the filter element of the filter system according to the invention, which, for example, can be provided with a molded-on plastic frame filter element (MPF element), in addition to the main filtration region with a first inflow surface of the filter bellows, a further filtration region with a second inflow surface is provided which serves for connection of a further intake location of a fluid, for example, air. The flow channel section for the second fluid flow is arranged within the frame and preferably arranged adjoining the filter bellows.

The separated further filtration region at the MPF element can be located in this context at the rim but also within the filter element. It is also possible to provide a plurality of filtration regions for different connection directions. Such an embodiment of the filter element comprises significant advantages compared to the prior art which, for example, describes snow valve solutions with filter elements of paper in which a nonwoven is attached at the filter element at the raw air side, the nonwoven sealing directly a further inflow channel. The filter element according to the invention comprises a separate inflow surface through which a separate second fluid flow can be supplied which can also be heated, for example. In this manner, it is possible to filter different air flows with a filter element with a molded-on plastic frame. As a filter bellows, for example, a zigzag-folded filter bellows of a nonwoven can be used.

According to an advantageous embodiment, the flow channel can extend from the raw-side inlet to the second inflow surface through at least one part of a flat side of the filter bellows. The connection of the further intake location for the second fluid flow can thus be realized across the flat side of a separated region at the molded-on plastic frame filter element with or without a partial deflection of the second fluid flow and can thus be accommodated in a beneficial manner with regard to installation space.

According to an advantageous embodiment, the flow channel can extend from the raw-side inlet to the second inflow surface through at least one part of a filter element rim segment. The connection of the further intake location can thus be realized by the rim segment of a separated region at the molded-on plastic frame filter element with a partial deflection of the second fluid flow and can thus be accommodated in a beneficial manner with regard to installation space.

According to an advantageous embodiment, a valve can be arranged in the second inlet for the second fluid flow in a housing part. For reasons relating to the installation space, the valve can be beneficially combined with the second inlet so that a filter system as compact as possible can be realized. In addition, a reliable function of the filter system in normal operation with filtration as effective as possible can be achieved in this way in the region of the first inflow surface.

According to an advantageous embodiment, an inflow of fluid through the valve can be designed to be pressure-controlled or can be designed to be controlled by a flow resistance. In this way, it can be advantageously achieved that a second fluid flow enters the flow channel of the second inflow surface only in case of clogged first inflow surface, because a corresponding vacuum is created thereby in the filter system. The region of the second inflow surface in the filter element is thus active only in emergency operation while a first fluid flow flows only through the first inflow surface in normal operation.

According to an advantageous embodiment, a flow chamber with a valve, for example, designed as a check valve, can be embodied for the second fluid flow in a housing part. In this manner, it can be effectively prevented that a fluid flow flows in through the second inflow surface in normal operation; instead only when the first inflow surface is clogged. In this way, a reliable function of the filter system in normal operation with filtration as effective as possible can be achieved in the region of the first inflow surface.

According to an advantageous embodiment, the filter element can be designed as a drawer filter element that is inserted or can be inserted transversely to the main flow axis of the fluid into the filter housing. Advantageously, the filter bellows can be designed as a flat filter bellows. The bellows of a flat filter provides a beneficial configuration for an air filter and can be used advantageously in particular as a drawer filter so that beneficial installation space conditions result.

According to an advantageous embodiment, the filter housing can comprise an insertion compartment with a frame guide for the filter element by means of which the filter element, via an insertion opening of the filter housing, can be inserted into the insertion compartment so that a seal of the filter element rests circumferentially against a housing seal surface and seal-tightly relative to a main flow axis of the fluid in an axial direction. The flow direction of the fluid through the filter bellows is preferably parallel to the main flow axis. A drawer filter element represents an easy mounting solution for the integration of the filter element in a filter system and can also be easily exchanged in a servicing situation. Alternatively, it is however also possible to insert the filter element, for example, from above into a housing bottom part of a filter housing that can be closed subsequently by a housing cover.

The described filter system can be used advantageously as an air filter, in particular as an air filter of an internal combustion engine or as a cabin air filter, in particular of a motor vehicle.

BRIEF DESCRIPTION OF THE DRAWINGS

Further advantages result from the following drawing description. In the drawings, embodiments of the invention are illustrated. The drawings, the description, and the claims contain numerous features in combination. A person of skill in the art will consider the features expediently also individually and combine them to expedient further combinations.

DESCRIPTION OF PREFERRED EMBODIMENTS

Figure 1:
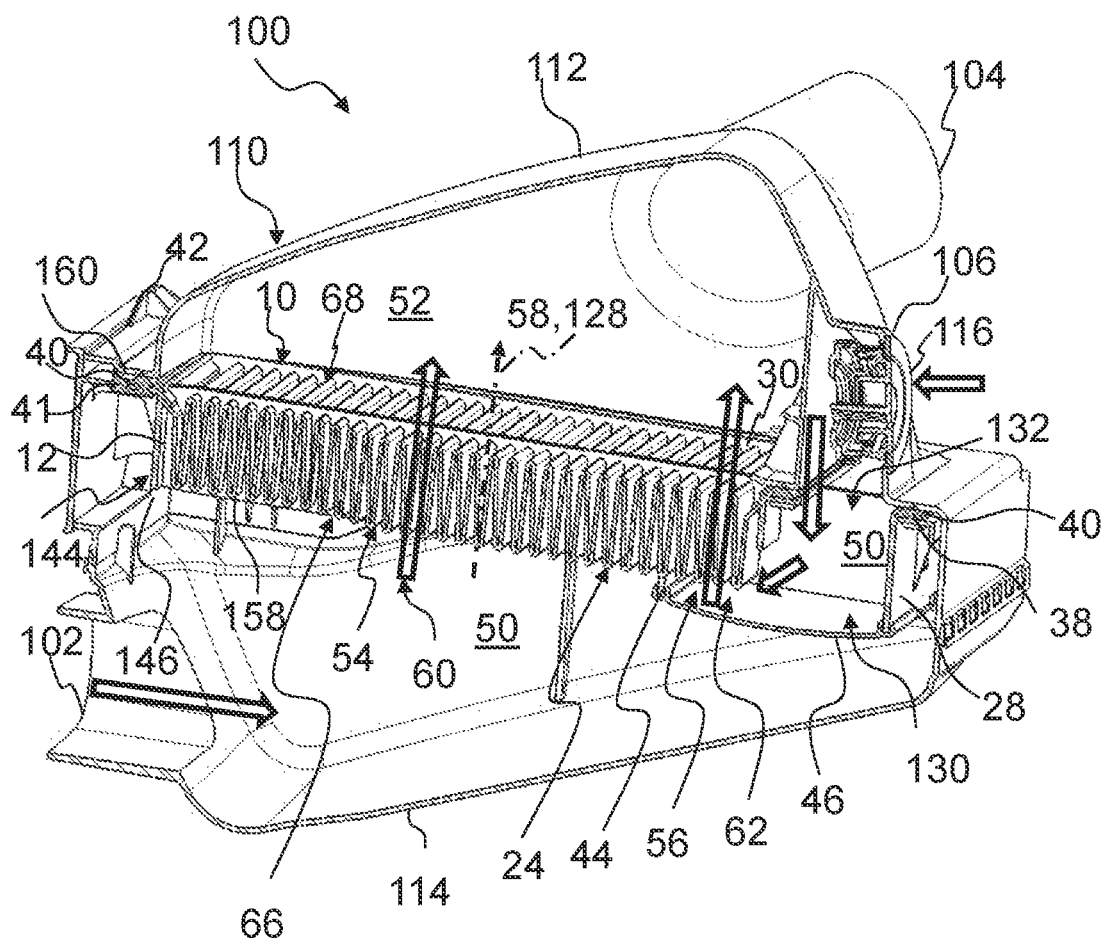
FIG. 1 shows a sectioned isometric illustration of a filter system with mounted drawer filter element according to an embodiment of the invention with inflow surfaces for a first and a second fluid flow.

In the Figures, same or same-type components are identified with the same reference characters. The Figures show only examples and are not to be understood as limiting.

Figure 2:
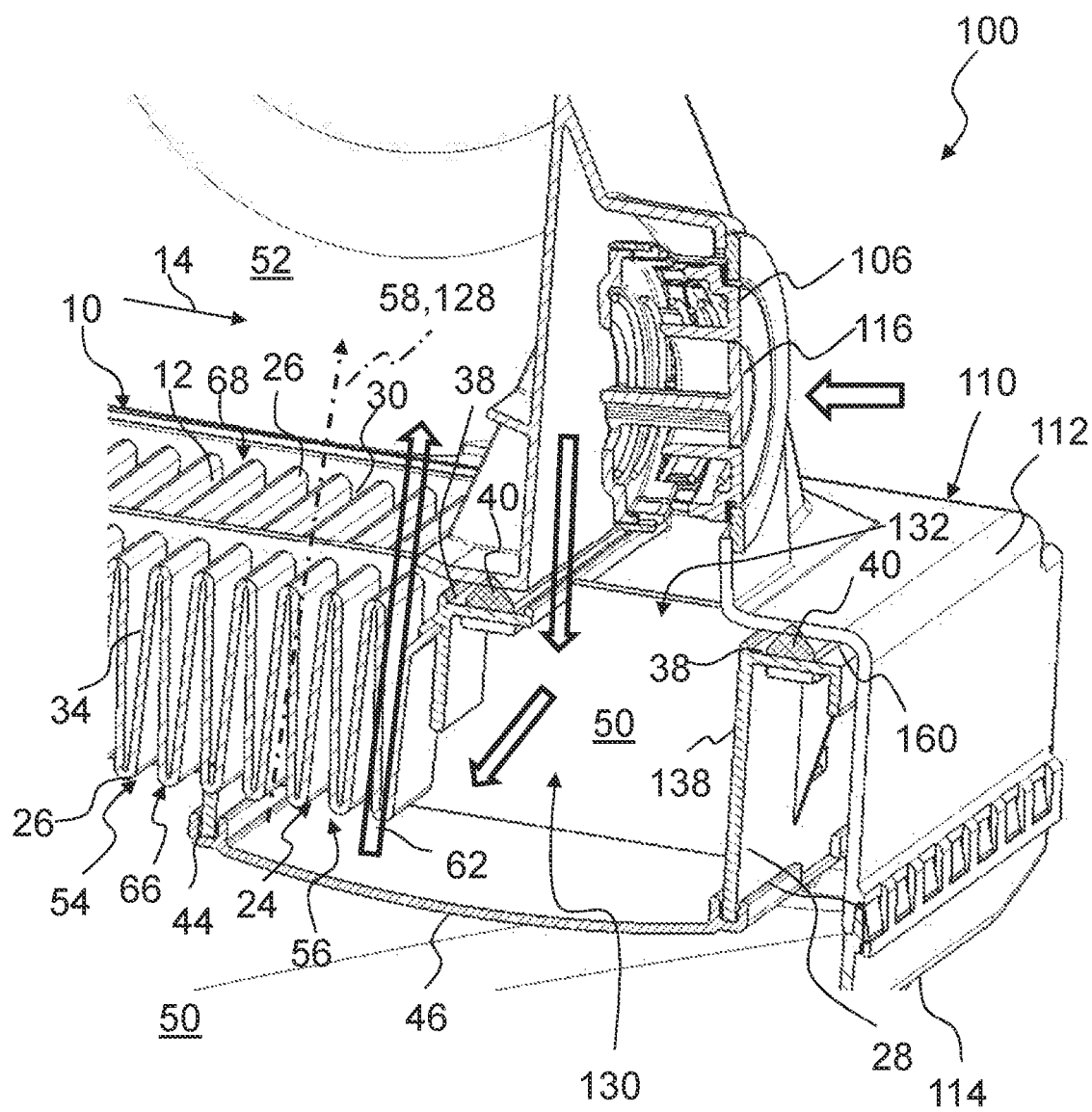
FIG. 2 shows a detail view of the filter system according to FIG. 1 in the region of the second inflow surface.
Figure 3:
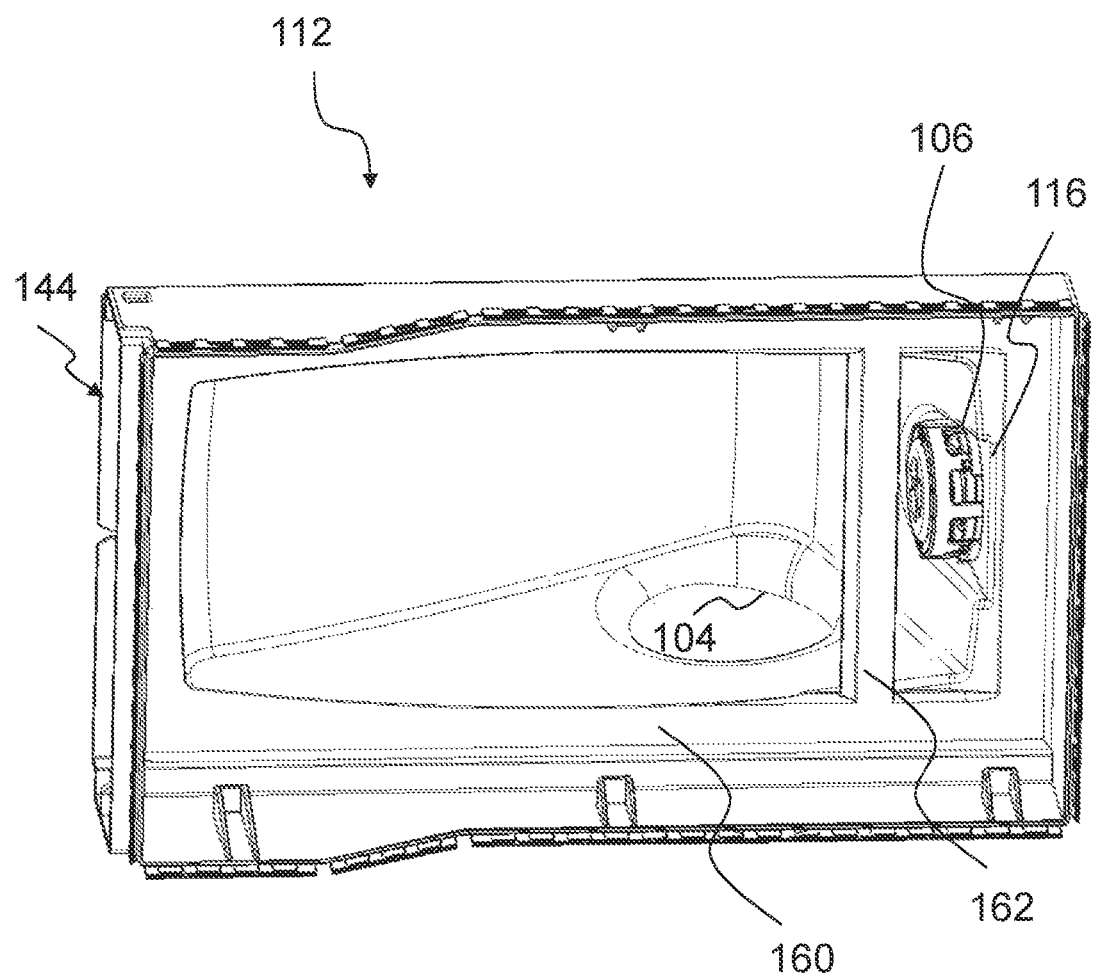
FIG. 3 shows an isometric illustration of the housing part with an inlet for the second fluid flow of the filter system according to FIG. 1.

FIG. 1 shows a sectioned isometric illustration of a filter system 100 with mounted drawer filter element 10 according to an embodiment of the invention with inflow surfaces 54, 56 for a first and a second fluid flow 60, 62, while in FIG. 2 a detail view of the filter system 100 according to FIG. 1 in the region of the second inflow surface 56 is illustrated. FIG. 3 shows an isometric illustration of the housing part 112, here, for example, the housing top part 112, with the inlet 106 for the second fluid flow 62 of the filter system 100 according to FIG. 1.

The filter system 100 comprises a filter housing 110 with a first housing part 112, for example, a housing top part 112, and a second housing part 114, for example, a housing bottom part 114, as well as a filter element 10 for filtering a fluid arranged exchangeably in the filter housing 110 between a raw side 50 and a clean side 52. The filter element 10 comprises in this context a one-piece filter bellows 12, for example, with a raw-side inflow side 66 and a clean-side outflow side 68. The inflow side 66 comprises a first areal inflow surface 54 for a first fluid flow 60 as well as a second inflow surface 56 for a second fluid flow 62 separate from the first fluid flow 60. The fluid flows 60, 62 are indicated by wide arrows. The second inflow surface 56 in this example is formed by a rim segment 30 of the filter bellows 12. The rim segment 30 can be flowed through along a flow direction 58 as well as at a slant thereto.

The first fluid flow 60 enters the filter housing 110 at the raw side 50 through a first inlet 102 of the housing bottom part 114 and flows then via the first inflow side 54 through the filter bellows 12 in a flow direction 58 toward the clean side 52. Via an inlet 106 in which an optional valve 116 is arranged, the second fluid flow 62 enters a flow channel 130 through which the second fluid flow 62 is guided to the second inflow surface 56. Both fluid flows 60, 62 exit again through the outlet 104 from the filter housing 110. The second inflow surface 56 is fluid-tightly separated from the first inflow surface 54 by a separation element 44 and a cover element 46 connected thereto. The cover element 46 is, for example, pushed onto the separation element 44 and the frame 28.

The flow channel 130 comprises a flow channel section 132 adjoining the filter bellows 12 of the filter element 10. Filter bellows 12 and flow channel section 132 are surrounded together by a frame 28, in particular the frame 28 is molded around them. The cover element 46 closes off the flow channel section 132 at the end face. The flow channel section 132 guides the raw-side second fluid flow 62 past the filter bellows 12. Due to a flow reversal, the second fluid flow 62 reaches the second inflow surface 56. The inlet 106 is positioned at the side of the filter bellows 12 which is positioned opposite the two inflow surfaces 54, 56.

The frame 28 comprises a seal surface 38 on which a seal 40 in the form of a loop element is arranged which seals against the corresponding housing seal surface 160 of the filter housing 110. The flow channel section 132 of the flow channel 130 is arranged between filter bellows 12 and an end face wall 138 of the frame 28.

The separation element 44 is attached to the folds 34 of the filter bellows 12, for example, glued on. The separation element 44 is connected to the cover element 46 for areal coverage of the second inflow surface 56 against the first fluid flow 60. The cover element 46 is pushed onto the separation element 44 and the end face wall 138 of the frame 28.

In this example, the filter element 10 with the filter bellows 12 is configured as a flat filter in the form of a drawer filter element. For this purpose, the filter housing 110 comprises an insertion compartment 146 with a frame guide 158 for the filter element 10 by means of which the filter element 10 can be inserted through an insertion opening 144 of the filter housing 110 transversely to the flow direction 58 into the insertion compartment 146 so that a seal 40 of the filter element 10 rests circumferentially against a housing seal surface 160 and seal-tightly relative to the main flow axis 128 of the fluid in an axial direction. The flow direction 58 is parallel to the main flow axis 128. The flow direction 58, for example, is oriented here perpendicularly to the inflow surfaces 54, 56 and outflow side 68 or outflow surface. Preferably, outflow surface and inflow surface in a filter bellows 12 with erected folds 34 form the surfaces in which respectively the inflow-side and outflow-side fold edges 26 (FIG. 2) are positioned.

Optionally, other geometries of the filter element 10 instead of a flat filter can be provided also, for example, a stepped filter element.

In the housing top part 112 of the filter housing 110, the inlet 106 for the second fluid flow 62 is embodied with a valve 116 for the second fluid flow 62. The valve 116 is arranged at the second inlet 106 and can be designed, for example, as a check valve. An inflow of the fluid through the valve 116 can be realized in this context by pressure control or controlled by a flow resistance. The valve 116 is however not mandatorily required for the function of the second inflow surface 56 as separate filtration region for an emergency operation when the inflow surface 54 is clogged.

FIG. 3 shows an isometric illustration of the housing top part 112 of the filter system 100 according to FIG. 1. The housing top part 112 comprises the clean-side outlet 104 of the fluid of the filter housing 110 and the second inlet 106 for the second fluid flow 62 (see FIGS. 1 and 2). The housing seal surface 160 of the filter housing 110 can be seen against which the filter element 10 can be sealed with a seal 40 in the form of a loop element. A web 162 of the housing seal surface 160 is arranged between the clean-side region for the filter bellows 12 and the raw-side region for the flow channel section 132.

The housing part 112 comprises laterally an insertion opening 144 for the filter element 10 which is embodied as a drawer filter element.

Figure 4:
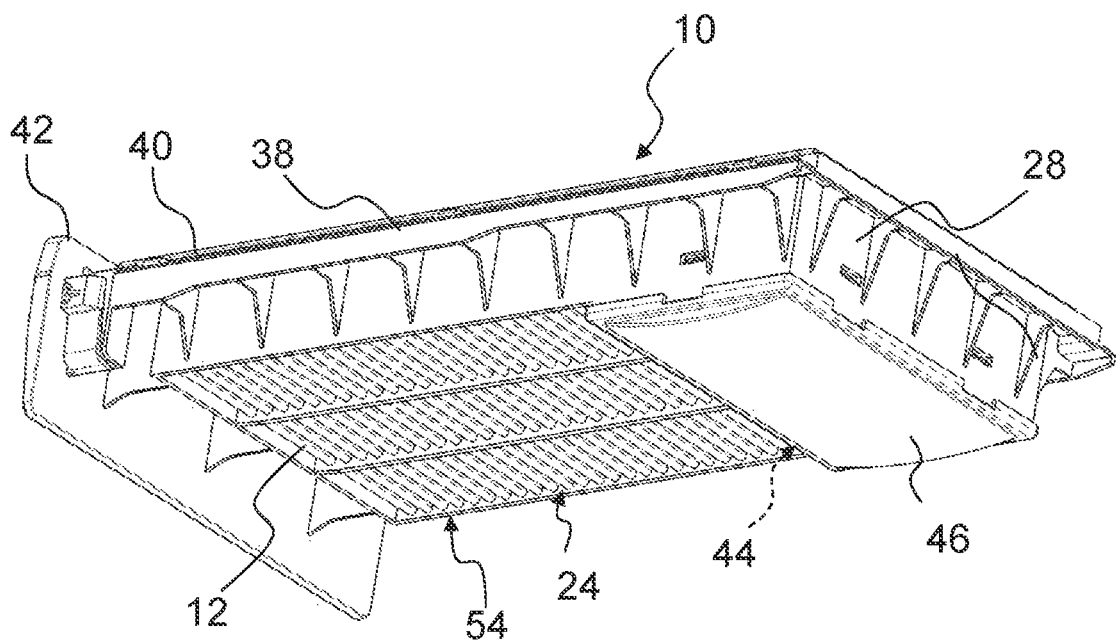
FIG. 4 shows an isometric illustration of the filter element of the filter system according to FIG. 1.
Figure 5:
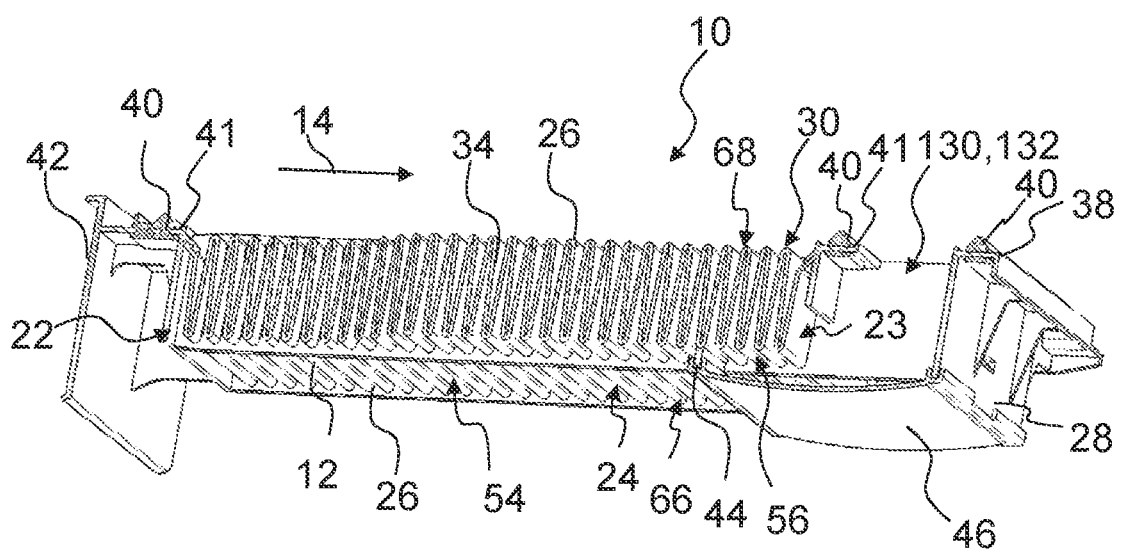
FIG. 5 shows a sectioned isometric illustration of the filter element of the filter system according to FIG. 1.

In FIG. 4, an isometric illustration of the filter element 10 of the filter system 100 according to FIG. 1 is shown while FIG. 5 shows a sectioned isometric illustration of the filter element 10. The filter element 10 is embodied as a flat filter in the form of a drawer filter element and comprises, in addition to the filter bellows 12 with molded-on plastic frame with flow channel section 132, at one end a closure element 42 with which an insertion opening 144 in the filter housing 110 is closed. The sealing action between raw side 50 and clean side 52 of the filter system is realized by the seal 40 which is arranged on the frame 28 and which seal-tightly contacts the housing seal surface 160 (FIG. 2) in the mounted state.

The filter bellows 12 of the filter element 10 is folded in a zigzag shape to folds 34 with parallel fold edges 26 embodied at the inflow side and outflow side, respectively, which sequentially follow each other in a longitudinal extension 14 between oppositely positioned end face edges 22, 23 of the filter bellows 12 and extend between oppositely positioned sides of the filter bellows 12, respectively.

What is claimed is:

1. A filter element for filtering a fluid, the filter element comprising:
   a frame;
   at least one filter bellows arranged in the frame and comprising a first areal inflow surface for a first fluid flow of the fluid and at least one second inflow surface for a second fluid flow of the fluid separate from the first fluid flow of the fluid, wherein the at least one second inflow surface is separate from the first areal inflow surface;
   a flow channel configured to guide the second fluid flow of the fluid, wherein the flow channel comprises a raw-side flow channel section arranged within the frame;
   and a separation element and a cover element configured to fluid-tightly separate the second inflow surface from the first areal inflow surface, wherein the cover element is arranged between the separation element and the frame;
   wherein the raw-side flow channel section of the flow channel comprises at least one flow deflection for the second fluid flow of the fluid between at least one second inlet and the at least one second inflow surface; wherein the at least one flow deflection is a flow reversal.

2. The filter element according to claim 1, wherein the raw-side flow channel section adjoins an end face of the at least one filter bellows.

3. The filter element according to claim 1, wherein the raw-side flow channel section comprises a segment parallel to or at a slant to a narrow side of the at least one filter bellows and a segment parallel to or at a slant to an end face of the at least one filter bellows.

4. The filter element according to claim 1, wherein the cover element covers the raw-side flow channel section at an end face of the at least one filter bellows and covers the at least one second inflow surface.

5. The filter element according to claim 1, wherein the frame comprises a seal surface configured to seal the at least one filter bellows and the raw-side flow channel section against a filter housing and configured to seal between an outflow side of the at least one filter bellows and the raw-side flow channel section.

6. The filter element according to claim 1, wherein the frame and the at least one filter bellows together form a drawer filter element.

7. A filter system for filtering a fluid, the filter system comprising:
   a filter housing; and
   a filter element arranged exchangeably in the filter housing between a raw side of the filter system clean side of the filter system;
   the filter element comprising a frame and at least one filter bellows arranged in the frame, wherein the at least one filter bellows comprises a first areal inflow surface for a first fluid flow of the fluid and at least one second inflow surface for a second fluid flow of the fluid separate from the first fluid flow of the fluid, and wherein the at least one second inflow surface is separate from the first areal inflow surface;
   the filter housing comprising a first inlet for the first fluid flow of the fluid communicating with the first areal inflow surface and at least one second inlet for the second fluid flow of the fluid communicating with the at least one second inflow surface;
   a flow channel extending from the at least one second inlet of the filter housing to the at least one second inflow surface and configured to guide the second fluid flow of the fluid to the at least one second inflow surface;
   the flow channel comprising a raw-side flow channel section, wherein the raw-side flow channel section is arranged inside the filter element, wherein the raw-side flow channel comprises at least one flow deflection for the second fluid flow of the fluid between the at least one second inlet and the at least one second inflow surface, and wherein the at least one flow deflection is a flow reversal.

8. The filter system according to claim 7, wherein the flow channel extends from the at least one second inlet to the at least one second inflow surface across at least a part of a flat side of the filter bellows and/or wherein the flow channel extends from the at least one second inlet to the at least one second inflow surface through at least a part of a rim segment of the filter element.

9. The filter system according to claim 7, wherein a valve is arranged in the at least one second inlet for the second fluid flow of the fluid in a housing part of the filter housing.

10. The filter system according to claim 9, wherein the valve is pressure-controlled or controlled by a flow resistance to enable an inflow of the second fluid flow of the fluid.

11. The filter system according to claim 7, wherein the filter element is a drawer filter element configured to be inserted transversely to a main flow axis of the fluid into the filter housing.

12. The filter system according to claim 7, wherein the filter element further comprises a separation element and a cover element configured to fluid-tightly separate the second inflow surface from the first areal inflow surface.

13. The filter system according to claim 12, wherein the cover element is arranged between the separation element and the frame.

14. The filter system according to claim 13, wherein the cover is connected to the separation element and to an end face wall of the frame.

15. The filter system according to claim 7, wherein the raw-side flow channel section of the flow channel is arranged between the at least one filter bellows and an end face wall of the frame.

16. The filter system according to claim 7, wherein the frame of the filter element comprises a seal surface and a seal arranged on the seal surface configured to seal against a corresponding housing seal surface of the filter housing.

\* \* \* \* \*